M. O. BAYLESS

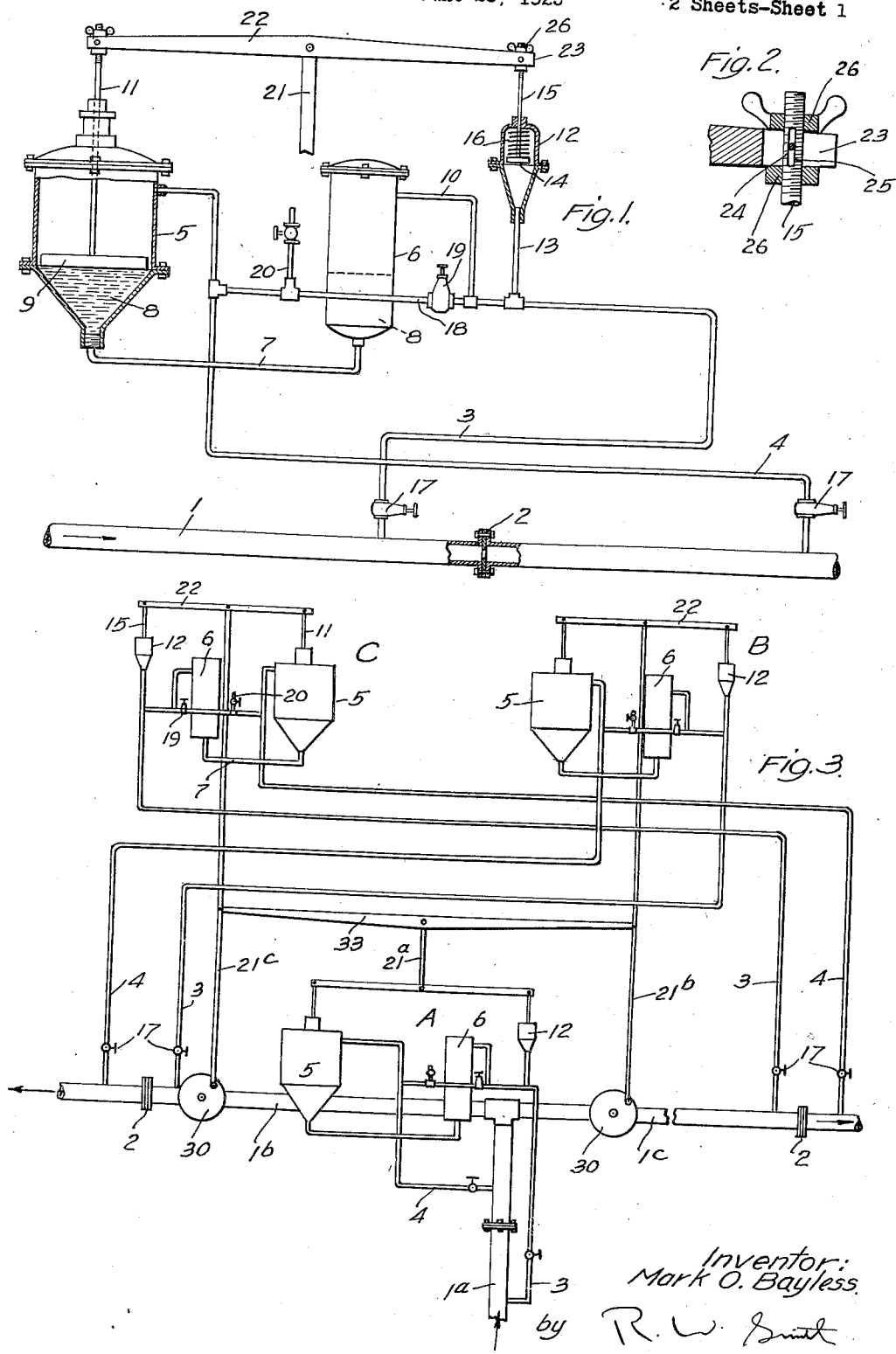
June 29, 1926.
M. O. BAYLESS
CONTROL SYSTEM
Filed June 23, 1925    2 Sheets-Sheet 1
1,590,275
Inventor:
Mark O. Bayless
by R. W. Smith
Attorney June 29, 1926.

CONTROL SYSTEM

Filed June 23, 1925

Inventor:
Mark O. Bayless
by R. W. Smith
Attorneys

Patented June 29, 1926.

1,590,275

UNITED STATES PATENT OFFICE.

MARK O. BAYLESS, OF LONG BEACH, CALIFORNIA.

CONTROL SYSTEM.

Application filed June 23, 1925. Serial No. 38,984.

It is the object of this invention to provide operating means for a valvular control, said operating means being actuated in accordance with the volume of flow of a fluid.

In the case of a liquid flow the differential pressure at opposite sides of a restricted orifice in the flow conduit determines the movement of the operating connection for the valvular control, since said differential pressure varies in accordance with the volume of the flow; and with a gaseous flow both the static pressure and said differential pressure control the movement of the operating connection for the valvular control, since variations in both said pressures are factors in determining the volume of flow of a gas.

The valvular control regulated in accordance with the volume of a flow may be utilized in a variety of fluid distributing systems, as for example in supplying a predetermined volume of a fluid or a proportional mixture of different fluids, or distributing the volume of a fluid so as to establish different pressures in various branch conduits.

The invention will be readily understood from the following description of the accompanying drawings, in which:

Fig. 1 is a front elevation, partly in vertical section, of one of the operating units.

Fig. 2 is a detail section through the end of one of the operating levers.

Figure 4:
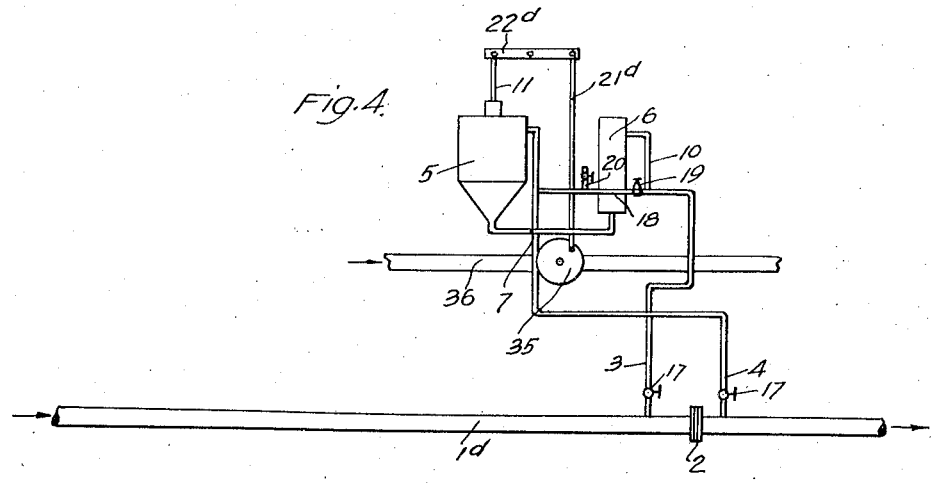
Figure 5:
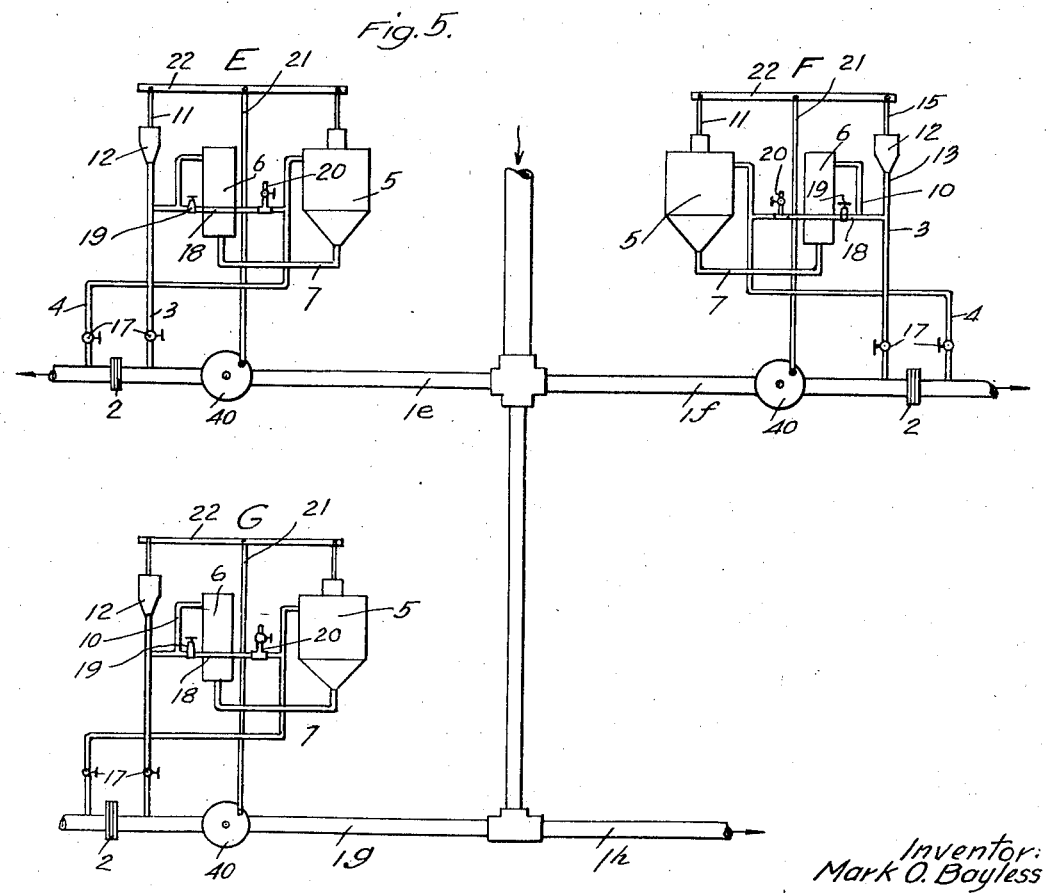

Figs. 3, 4, and 5 are diagrams showing the units of the invention employed in various distributing systems.

A unit of the invention is shown in Fig. 1, and comprises operating means for a valvular control, the operating means moving responsive to the volume of flow through a conduit 1. An orifice plate 2 is mounted in the conduit, and pipes 3 and 4 lead from the conduit at the upstream and downstream sides respectively of the orifice plate.

Pipes 3 and 4 are connected to a differential pressure response device, which is illustrated as comprising chambers 5 and 6 communicating at their lower ends through a pipe 7 and containing a suitable liquid such as mercury 8. A float 9 rests upon the surface of the liquid in chamber 5, and pipe 4 communicates with said chamber above the float, while pipe 3 opens through a branch pipe 10 into chamber 6. The pressure in pipe 3 thus raises the liquid in chamber 5 against the tendency of the pressure in pipe 4 to lower said liquid, and the movement of float 9 is consequently in accordance with the differential pressure in conduit 1 at opposite sides of the orifice plate 2. An operating rod 11 is connected to the float and projects outwardly through the end of chamber 5 for longitudinal movement of the rod in accordance with the differential pressure.

When the operating unit is connected to a conduit 1 which is adapted for the flow of a gas, a static pressure responsive device 12 is connected to pipe 3. For this purpose pipe 3 communicates through a branch pipe 13 with one end of a casing having a diaphragm 14 extending across the same. A rod 15 projects outwardly through the opposite end of the casing and is yieldably held against the diaphragm by a spring 16. The rod is thus shifted responsive to the yielding of the spring against the pressure in pipe 3, so that the movement of the rod is in accordance with the static pressure of the gas in conduit 1.

Pipes 3 and 4 are provided with valves 17, and in order to balance the float 9 while opening valves 17 for starting operation of the unit, a branch pipe 18 connects pipes 3 and 4 and is provided with a valve 19. The valve 19 is opened prior to the opening of valves 17 so as to balance the pressure in pipes 3 and 4, and after the valves 17 have been opened the valve 19 is closed so as to provide a differential pressure in pipes 3 and 4 for operation of the pressure responsive devices as previously described. Branch pipe 18 is preferably provided with a normally closed valve 20 for draining the operating unit when it is shut-off for repairs or the like.

When the flow through pipe 1 is a liquid, the movement of rod 11 is in accordance with the volume of the flow, since the rod is moved responsive to differential pressure and said differential pressure varies in accordance with the volume of a liquid flow. When gas passes through conduit 1, the movement of the static pressure responsive rod 15 together with the movement of the differential pressure responsive rod 11 provides a resulting movement which is in accordance with the volume of the gaseous flow, since both static and differential pressure are factors in determining the volume of flow of a gas.

As a consequence when the flow in pipe 1 is a gas, the valvular control which is regulated in accordance with the volume of the flow, is controlled by an operating means connected to both rods 11 and 15 as shown in Fig. 1; and when the flow is a liquid, the valvular control is regulated by operating means connected only to rod 11 as shown in Fig. 4, and the static pressure responsive device 12 is not employed.

Referring to Fig. 1, the operating means for the valvular control is shown as comprising a rod 21 pivoted to the medial portion of a lever 22 which is connected at its respective ends to the rods 11 and 15. The lever is thus shifted by the movement of both rods 11 and 15, and in turn shifts the operating rod 21 for regulating the valvular control as hereinafter described.

Referring to Fig. 4, the operating means for the valvular control comprises a lever $22^d$ fulcrumed at a medial point and connected at its respective ends to the rod 11 and an operating rod $21^d$. The movement of rod 11 thus shifts the rod $21^d$ for regulating the valvular control.

The connections between the levers and rods are preferably adapted for adjustment of the operating means, and for this purpose the rods may extend through forked ends 23 of the levers as shown in Fig. 2, with studs 24 in said forked ends extending through elongated slots 25 in the rods, and nuts 26 threaded on the rods against opposite sides of the forked lever ends. The operating means may thus be adjusted by turning nuts 26 to vary the lengths of the rods.

Operating units as thus described may be used in various fluid distributing systems, examples of different uses of the units being shown in Figs. 3, 4, and 5.

Fig. 3 shows a distributing system adapted for supplying gas to a plurality of oil wells for elevating the oil. Gas is supplied through pipe $1^a$ to branch pipes $1^b$ and $1^c$ leading to the respective wells, and valvular controls 30 are provided in pipes $1^b$ and $1^c$ and are regulated by operating units A, B, and C of the type shown in Fig. 1, for distributing the volume of the flow of gas to the respective wells in accordance with the different pressures required therein.

Unit A is connected to main pipe $1^a$, and units B and C are connected to the branch pipes $1^b$ and $1^c$ respectively. The valve 30 in each branch pipe is controlled by the unit connected to the other branch pipe and also by the unit A, and as a consequence the flow through each branch pipe is regulated by the volume of flow through the main pipe and by the volume of flow through the other branch pipe, so that the proper volume of gas will be supplied to the respective wells for building the required pressure therein, it being understood that the orifices in plates 2 which are mounted in pipes $1^b$ and $1^c$ are of a relative size to provide the desired pressures in the respective wells when the volume of flow of gas is correspondingly distributed.

As an instance of this control for the valves 30, the rod $21^a$ of unit A is pivoted to the medial portion of a lever 33 which is connected at its ends to the operating rods $21^b$ and $21^c$ of the units B and C. Rod $21^d$ is connected to the valve 30 in pipe $1^c$ for regulation thereof, and in similar manner the rod $21^e$ is connected to the valve in pipe $1^b$.

In Fig. 4 an operating unit D having no static pressure responsive device 12 is employed in a distributing system where two fluids are to be mixed in a predetermined proportion, as for example in an oil refinery where a specified amount of sulphuric acid is mixed with a certain volume of oil.

The oil flows through pipe $1^d$, and operating unit D is connected thereto, with its operating rod $21^d$ controlling a valve 35 in the supply pipe 36 for the sulphuric acid. The supply of acid is thus controlled by valve 35 which is in turn regulated by the volume of the flow of oil, in order to maintain the predetermined proportional mixture of acid and oil.

Fig. 5 illustrates means for controlling the distribution of predetermined volumes of a gas through respective pipe lines, as in a gas distributing system where it is desired to supply each of different neighborhoods with a volume of gas equal to its predetermined normal requirements.

Pipe lines $1^e$, $1^f$, etc. lead to the various sections of the territory served, and operating units E, F, etc., of the type shown in Fig. 1, are connected to the respective pipe lines. Valves 40 in the respective pipe lines control the flow therethrough, the valve in each pipe line being regulated by the operating rod 21 of the unit connected to said pipe. The flow through each pipe is thus controlled by the volume of flow in said pipe, so that adjustment of the operating units will maintain any desired volume of flow through the respective pipes.

From the foregoing description of the invention it will thus be seen that the improved control system is of general utility for positively and accurately regulating a control means in accordance with the volume of a flow.

I claim:

1. The combination of a main conduit, a pair of branch conduits communicating therewith, valvular controls in the respective branch conduits, and means for adjusting the valvular control in each of said branch conduits in accordance with the volume of flow through the other branch conduit and the volume of flow through the main conduit.

2. The combination of a conduit having a restricted orifice for passage of the flow through said conduit, a static pressure responsive device, a differential pressure responsive device, pipes communicating with the conduit at opposite sides of the restricted orifice, the upstream pipe leading to the static pressure responsive device and to one side of the differential pressure responsive device, the downstream pipe leading to the opposite side of the differential pressure responsive device, a normally closed by-pass connecting said pipes, and an operating connection actuated by said static and differential pressure responsive devices.

3. The combination of a conduit having a restricted orifice for passage of a flow through said conduit, a member movable responsive to the static pressure in said conduit, a member movable responsive to the differential pressure in said conduit at opposite sides of said orifice, a lever pivoted at its respective ends to said pressure responsive members, an operating connection pivoted to the medial portion of said lever, and a valve regulated by movement of said operating connection.

4. The combination of a main conduit, a pair of branch conduits communicating therewith, valvular controls in the respective branch conduits, a control unit for each of said main and branch conduits comprising an orifice plate in the conduit, a member movable responsive to the static pressure in said conduit, a member movable responsive to the differential pressure in said conduit at opposite sides of the orifice plate, and a lever pivoted at its respective ends to said pressure responsive members; operating means for the valvular control in each branch conduit connected to the medial portion of the lever of the control unit for the other branch conduit, a lever connected at its respective ends to said operating means, and an operating connection between the medial portion of the last mentioned lever and the medial portion of the lever of the control unit for the main conduit.

5. The combination of a main conduit, a pair of branch conduits communicating therewith, valvular controls in the respective branch conduits, a means for operating the valvular control in each of the branch conduits movable in accordance with the volume of flow through the other branch conduit, and a member movable in accordance with the volume of flow through the main conduit operatively connected to both of said valvular operating means.

6. The combination of a conduit having a restricted orifice for passage of the flow through said conduit, a static pressure responsive device, a differential pressure responsive device, pipes communicating with the conduit at opposite sides of the restricted orifice, the upstream pipe leading to the static pressure responsive device and to one side of the differential pressure responsive device, the downstream pipe leading to the opposite side of the differential pressure responsive device, and an operating connection actuated by said static and differential pressure responsive devices.

In testimony whereof I have affixed my signature to this specification.

MARK O. BAYLESS.